Aug. 25, 1925.

T. M. COX

BUMPER ATTACHING DEVICE

Filed Jan. 7, 1924

1,551,370

INVENTOR.
Theodore M. Cox
BY
ATTORNEY.

Patented Aug. 25, 1925.

1,551,370

UNITED STATES PATENT OFFICE.

THEODORE M. COX, OF ALBANY, NEW YORK, ASSIGNOR TO THE EATON AXLE & SPRING COMPANY, OF CLEVELAND, OHIO.

BUMPER-ATTACHING DEVICE.

Application filed January 7, 1924. Serial No. 684,710.

*To all whom it may concern:*

Be it known that I, THEODORE M. COX, a citizen of the United States of America, residing at Albany, in the county of Albany and State of New York, have invented certain new and useful Improvements in Bumper-Attaching Devices, of which the following is a specification.

This invention relates to attaching devices for automobile bumpers, the object of the invention being to provide a simple, inexpensive adjustable attachment bracket of neat appearance, adapted to connect a bumper bar to the frame of various types of automobiles.

The device which I have invented to accomplish this object is illustrated in the accompanying drawings, in which.

The dotted lines in the various figures of the drawings indicate that portion of an automobile frame to which my improved attaching device is adapted to fasten. The same reference characters refer to the same parts throughout the several views.

Figure 1:
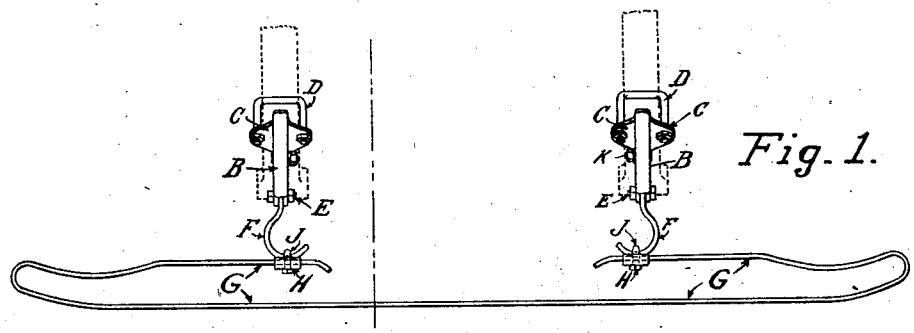
Fig. 1 is a plan view of a bumper bar with my improved attaching device connected thereto.
Figure 2:
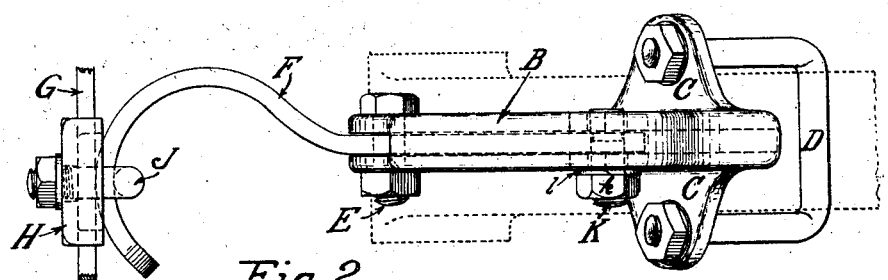
Fig. 2 is an enlarged plan view of the attaching device, with a portion of a bumper bar fastened in place.
Figure 3:
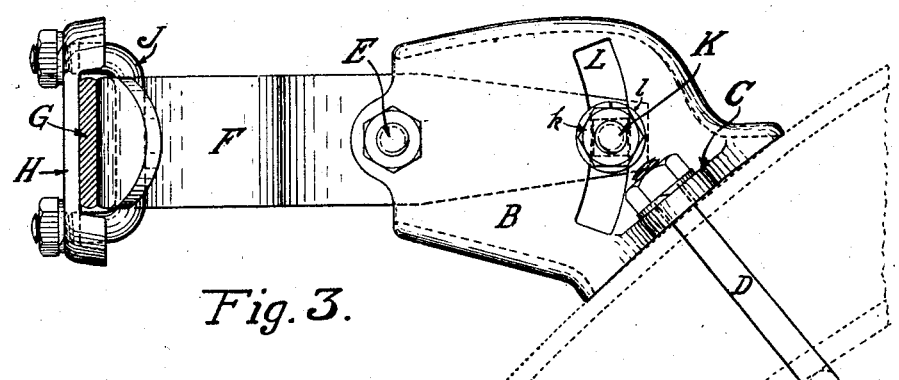
Fig. 3 is a side elevation of Fig. 2.

Referring to the drawings, it will be noted that this improved attaching device consists of a comparatively flat hollow body casting B, the portion thereof which is adapted to contact with the frame of an automobile being broadened out so as to form ears C, C, provided with openings therethrough adapted to pass the shanks of a U-bolt D. The body casting B, and U-bolt D, encompass the part of an automobile frame as indicated in the drawings so that the tightening of the nuts on the U-bolt will cause the body casting to be firmly clamped in position on said frame.

Pivoted in the casting B, and on the bolt E, is a bracket arm F, the rear end of which is preferably tapered as illustrated; the front end of the arm is curved to form an open loop or hook against the curved end of which a bumper bar G, is clamped by means of a clip or yoke H, and a U-bolt, J.

Formed in each side of the body casting B, is a curved slot L, in which the bolt K, passing through an opening in the rear end of the arm F, may slide. This permits adjustment of the arm F, about its pivot point E, until the nut $k$, on the bolt K is tightened.

The bolt K, may be of any suitable type, but I prefer to use a square headed or a T-headed bolt having a head of a size which will enter and slide in the slots L, but will not turn therein; when such a bolt is used the tightening of the nut $k$, will cause the head of the bolt to contact with the side of the rear end of the arm F, and force it into, and hold it in, intimate contact with the side of the body casting B. The bracket arm and body casting will thus be held firmly in adjusted relation to each other, and in a manner which eliminates the probability of a rattle.

I claim:

1. An attaching device for automobile bumpers comprising a comparatively flat hollow member provided with means for securing it to an automobile frame, and a bumper-supporting bracket entering the said member and adjustably pivoted therein.

2. An attaching device for automobile bumpers, comprising a comparatively flat hollow casting with ears having openings therethrough formed on the sides thereof, a bolt hole through both sides and near one end thereof, and a slotted opening through both sides thereof and spaced from said bolt hole; a U-bolt the shanks thereof adapted to pass through the openings in said ears; a bracket arm with holes therethrough, one end thereof curved, the other end flat and adapted to enter the hollow in said casting; a bolt passing through the bolt hole in said casting and one of the holes through said arm, and a second bolt passing through the slotted opening in said casting and another hole through said arm; and a clamp adapted to fasten a bumper bar to the curved end of said arm.

3. An attaching device for automobile bumpers, comprising a comparatively flat hollow casting with ears having openings therethrough formed on the sides thereof, a bolt hole through both sides and near one end thereof, and a slotted opening through both sides thereof and spaced from said bolt hole; a U-bolt the shanks thereof adapted to pass through the openings in said ears; a bracket arm with holes therethrough, one end thereof curved, the other end flat and adapted to enter the hollow in said casting;

a bolt passing through the bolt hole in said casting and one of the holes through said arm, and a second bolt passing through the slotted opening in said casting and another hole through said arm; and means for fastening a bumper bar to the curved end of said arm.

4. An attaching device for automobile bumpers, comprising a comparatively flat hollow casting with ears having openings therethrough formed on the sides thereof, a bolt hole through both sides and near one end thereof, and a slotted opening through both sides thereof and spaced from said bolt hole; a U-bolt the shanks thereof adapted to pass through the openings in said ears; a bracket arm with holes therethrough, one end thereof curved, the other end flat and adapted to enter the hollow in said casting; a bolt passing through the bolt hole in said casting and one of the holes through said arm, and a second bolt passing through the slotted opening in said casting and another hole through said arm.

5. A bracket member for attaching a bumper to an automobile frame, comprising a comparatively flat hollow casting with ears having openings therethrough formed on the sides thereof and a bolt hole through said sides and near one end thereof, and a slotted opening through both sides thereof and spaced from said bolt hole.

In testimony whereof I have affixed my signature.

THEODORE M. COX.